(12) United States Patent
Serva

(10) Patent No.: US 10,252,580 B2
(45) Date of Patent: Apr. 9, 2019

(54) TREAD WEAR INDICATOR

(71) Applicant: The Goodyear Tire & Rubber Company, Akron, OH (US)

(72) Inventor: Jesse Brian Serva, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 188 days.

(21) Appl. No.: 15/413,452

(22) Filed: Jan. 24, 2017

(65) Prior Publication Data

US 2018/0207995 A1 Jul. 26, 2018

(51) Int. Cl.
 *B60C 11/24* (2006.01)
 *B60C 11/04* (2006.01)
 *B60C 11/03* (2006.01)

(52) U.S. Cl.
 CPC .......... *B60C 11/24* (2013.01); *B60C 11/04* (2013.01); *B60C 2011/0381* (2013.01)

(58) Field of Classification Search
 CPC .......................... B60C 11/24; B60C 11/032
 See application file for complete search history.

(56) References Cited

U.S. PATENT DOCUMENTS

| | | | |
|---|---|---|---|
| 2,102,784 A | 12/1937 | Bridges | 18/59 |
| 2,287,273 A | 6/1942 | Rabb | |
| 2,619,727 A | 12/1952 | Krohn, Jr. | |
| 2,706,509 A | 4/1955 | White | 152/209 |
| 3,653,422 A | 4/1972 | French | 152/209 R |
| 3,814,160 A | 6/1974 | Creasey | |
| D250,697 S | 1/1979 | Jordan | |
| 4,226,274 A | 10/1980 | Awaya et al. | 152/330 |
| 5,980,668 A | 11/1999 | Slingluff | 156/110.1 |
| 6,080,982 A | 6/2000 | Cohen | |
| 6,523,586 B1 | 2/2003 | Eromaki et al. | |
| 6,883,567 B2 | 4/2005 | Shimura | 152/154.2 |
| 6,994,133 B2 | 2/2006 | Willard, Jr. et al. | 152/152 |
| 7,011,126 B2 | 3/2006 | Heinen | 152/154.2 |
| 7,140,410 B2 | 11/2006 | Helt et al. | 152/154.2 |
| 7,670,123 B2 | 3/2010 | Cuny et al. | 425/28.1 |
| 7,784,508 B2 | 8/2010 | Kemp et al. | 152/154.2 |
| 8,162,014 B2 | 4/2012 | Mosko et al. | 152/154.2 |

(Continued)

FOREIGN PATENT DOCUMENTS

| | | |
|---|---|---|
| DE | 3627832 | 2/1988 |
| SU | 408833 * | 7/1974 |

OTHER PUBLICATIONS

English translation of SU408833. (Year: 1974).*

*Primary Examiner* — Robert C Dye
(74) *Attorney, Agent, or Firm* — Edward T. Kennedy

(57) ABSTRACT

A tread wear indicator for a tire is provided. The tire includes a pair of sidewalls and a tread, and the tread includes a plurality of tread elements defined by circumferential grooves and lateral grooves. The tread wear indicator is formed in a selected one of the tread elements. The indicator includes a plurality of concentric step elements that descend radially inwardly from a radially outward surface of the selected one of the tread elements. Each step element includes an axially-extending surface that is approximately parallel to and is radially inward of the radially outward surface of the selected one of the tread elements, and a radially-extending surface that extends approximately perpendicular to the axially-extending surface.

8 Claims, 4 Drawing Sheets

(56) References Cited

U.S. PATENT DOCUMENTS

| | | | |
|---|---|---|---|
| 8,403,012 B2 | 3/2013 | Harvey et al. | 152/154.2 |
| 8,584,721 B2 | 11/2013 | Fujii et al. | 152/154.2 |
| 8,695,655 B2 | 4/2014 | Cuny et al. | 152/154.2 |
| 8,857,252 B2 | 10/2014 | Lamb et al. | 73/146 |
| D717,727 S | 11/2014 | Parr et al. | D12/604 |
| D721,029 S | 1/2015 | Sato | |
| 8,960,246 B2 | 2/2015 | Shimomura et al. | 152/209.16 |
| D751,497 S | 3/2016 | Kidney | |
| D755,705 S | 5/2016 | Shin | |
| D758,297 S | 6/2016 | Kidney | |
| D765,589 S | 9/2016 | Hara | D12/604 |
| D786,172 S | 5/2017 | Komazaki et al. | |
| 2005/0269003 A1* | 12/2005 | Fujii | B60C 11/24 |
| | | | 152/154.2 |
| 2006/0037683 A1 | 2/2006 | Cuny et al. | |
| 2006/0213594 A1* | 9/2006 | Kemp | B60C 11/24 |
| | | | 152/154.2 |
| 2009/0095388 A1 | 4/2009 | Cuny et al. | |
| 2011/0079333 A1 | 4/2011 | Collette et al. | |
| 2011/0126949 A1 | 6/2011 | Cuny et al. | |
| 2012/0103484 A1 | 5/2012 | Ohashi | |
| 2013/0186531 A1 | 7/2013 | O'Brien | 152/154.2 |
| 2013/0206291 A1 | 8/2013 | Emorine et al. | 152/154.2 |
| 2014/0060167 A1 | 3/2014 | McNaught | |
| 2014/0365069 A1 | 12/2014 | Orlewski | |
| 2015/0328937 A1 | 11/2015 | Girard et al. | B60C 11/24 |
| 2015/0343850 A1 | 12/2015 | Dorfi et al. | B60C 11/1218 |
| 2016/0229232 A1 | 8/2016 | Baumgaertel et al. | |

\* cited by examiner

TREAD WEAR INDICATOR

FIELD OF THE INVENTION

The invention relates to pneumatic tires and to tread wear indicators for such tires. More particularly, the invention is directed to a visual tread wear indicator that is economical to form and is easy for a user to read.

BACKGROUND OF THE INVENTION

In the pneumatic tire art, it is known that, as the tread of the tire wears away, the ability to maintain traction may diminish on wet or snow-covered roads. Accordingly, once the tread is worn beyond a certain tread depth, the tire should be replaced to maintain adequate traction.

In order to inform a vehicle user when a tire may need to be replaced due to tread wear, prior art tread wear indicators were developed. For example, some tread wear indicators involved providing features molded in the base of the circumferential grooves of the tire tread. However, such tread wear indicators may undesirably interfere with the flow of water and materials through the groove. In addition, due to their placement in a groove, they may be difficult for a user to see.

Other indicators were developed, which we located in the tread elements of the tires. However, many such prior art indicators have undesirably interfered with tread performance and/or were difficult for a user to see. An additional disadvantage of prior art indicators that were disposed in the tread is that the indicators were of a simple configuration which wore away before the user saw or understood the wear indication.

Still other indicators were developed that involve sensors which measure tire wear and provide an alert or signal to the user as to the wear state of the tire. While such sensors are suitable for their intended purpose, they add to the cost of the tire.

As a result, there is a need in the art for a tread wear indicator for a pneumatic tire that is easy for a user to see, does not interfere with groove or tread element performance, and is economical to form.

SUMMARY OF THE INVENTION

According to an aspect of an exemplary embodiment of the invention, a tread wear indicator is formed in a tire. The tire includes a pair of sidewalls and a tread, and the tread includes a plurality of tread elements defined by circumferential grooves and lateral grooves. The tread wear indicator is formed in a selected one of the tread elements. The indicator includes a plurality of concentric step elements that descend radially inwardly from a radially outward surface of the selected one of the tread elements. Each step element includes an axially-extending surface that is approximately parallel to and is radially inward of the radially outward surface of the selected one of the tread elements, and a radially-extending surface that extends approximately perpendicular to the axially-extending surface.

Definitions

The following definitions are applicable to the present invention.

"Axial" and "axially" mean lines or directions that are parallel to the axis of rotation of the tire.

"Equatorial plane" means the plane perpendicular to the axis of rotation of the tire and passing through the center of the tire tread.

"Groove" means an elongated void area in a tread that may extend circumferentially or laterally about the tread in a straight curved, or zigzag manner.

"Inner" means toward the inside of the tire.

"Lateral" and "laterally" are used to indicate axial directions across the tread of the tire.

"Outer" means toward the outside of the tire.

"Radial" and "radially" are used to mean directions radially toward or away from the axis of rotation of the tire.

"Sipe" means a small elongated opening in the tread that improves traction characteristics.

"Tread" means a molded rubber component which includes that portion of the tire that comes into contact with the road when the tire is normally inflated and under normal load. The tread has a depth conventionally measured from the tread outer surface to the bottom of the deepest groove of the tire.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

Figure 1:
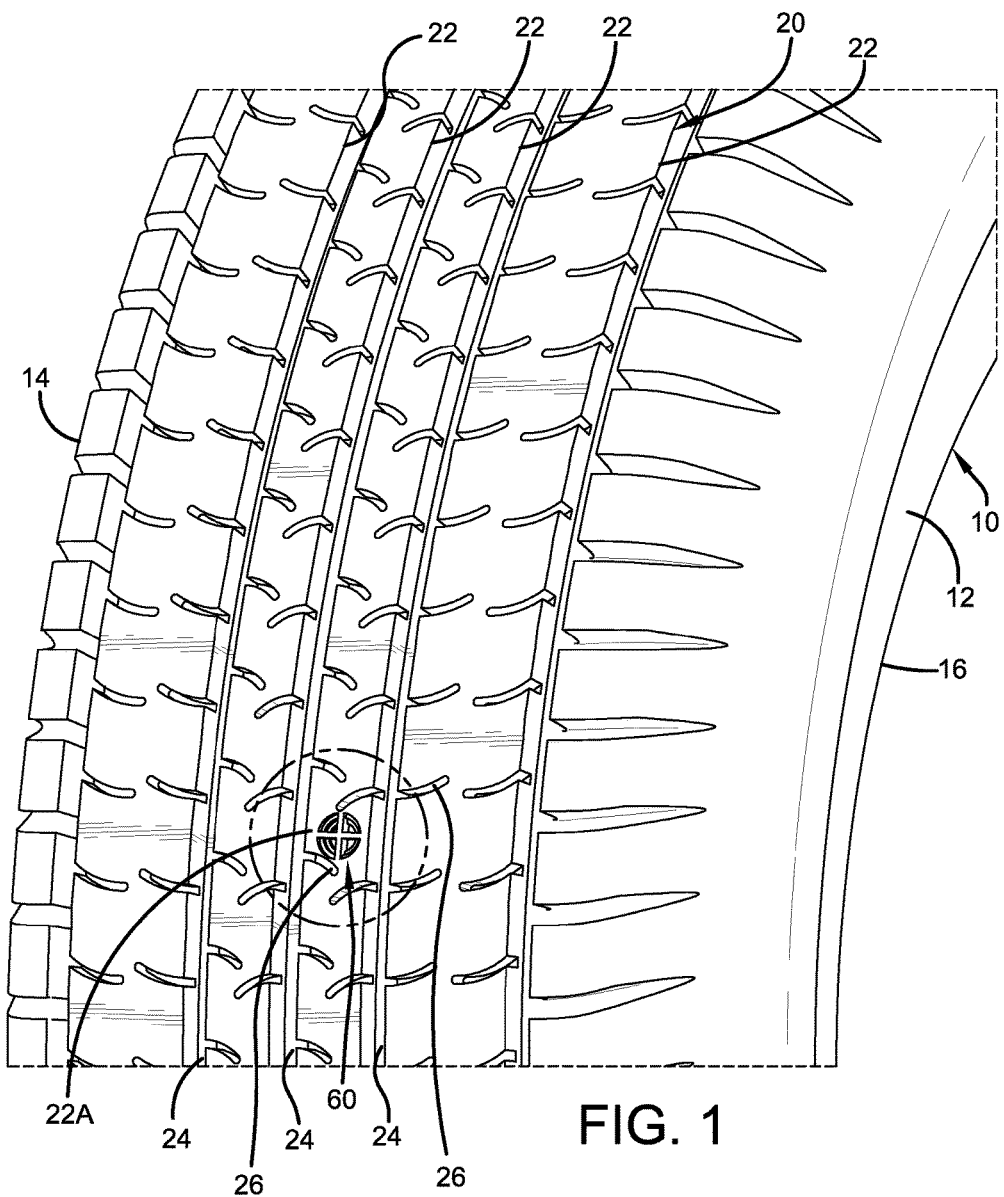
FIG. 1 is a fragmentary perspective view of a tire including an exemplary embodiment of the tread wear indicator of the present invention.
Figure 2:
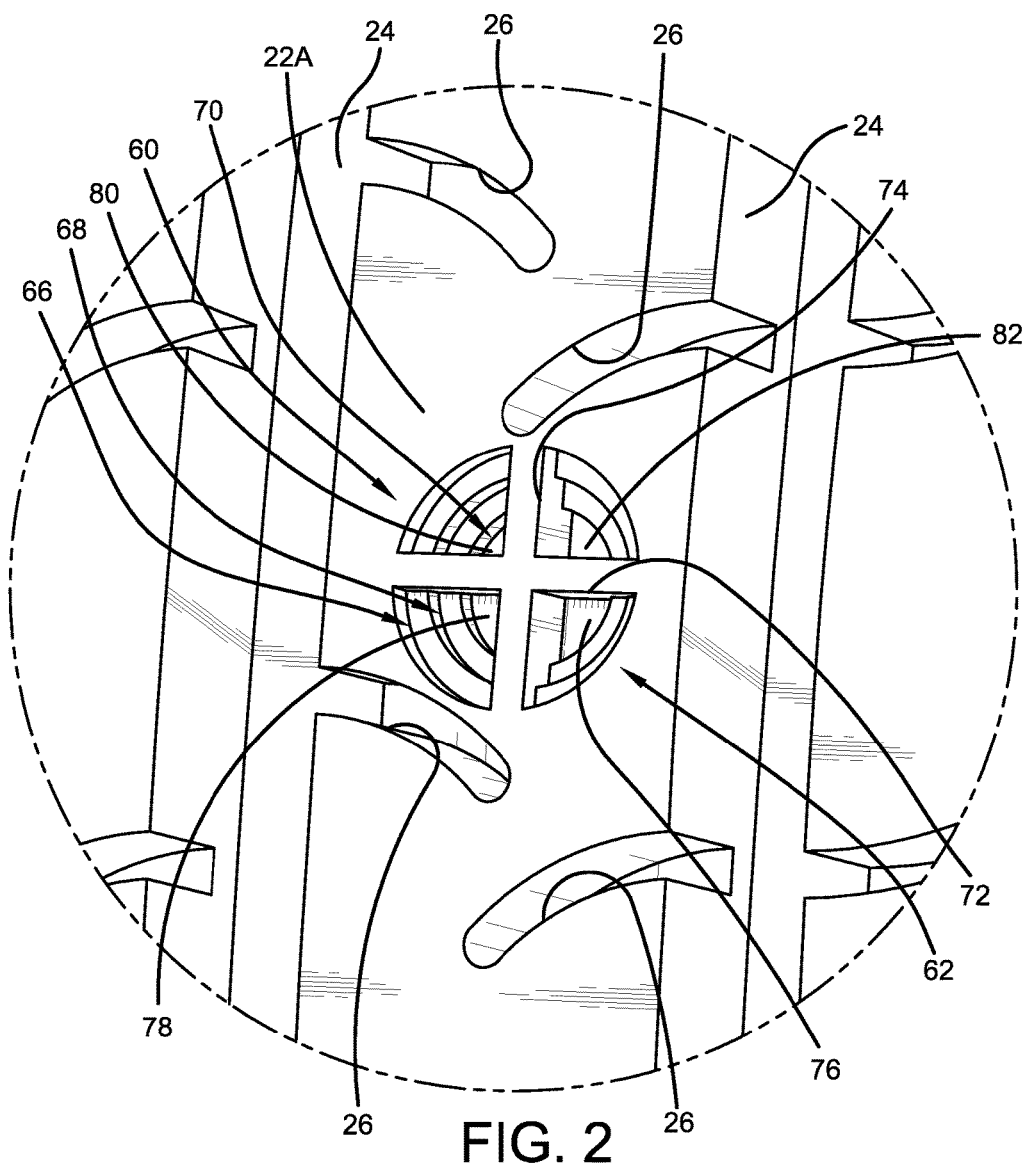
FIG. 2 is an enlarged fragmentary perspective view of the tire and tread wear indicator from the circled area shown in FIG. 1.
Figure 3:
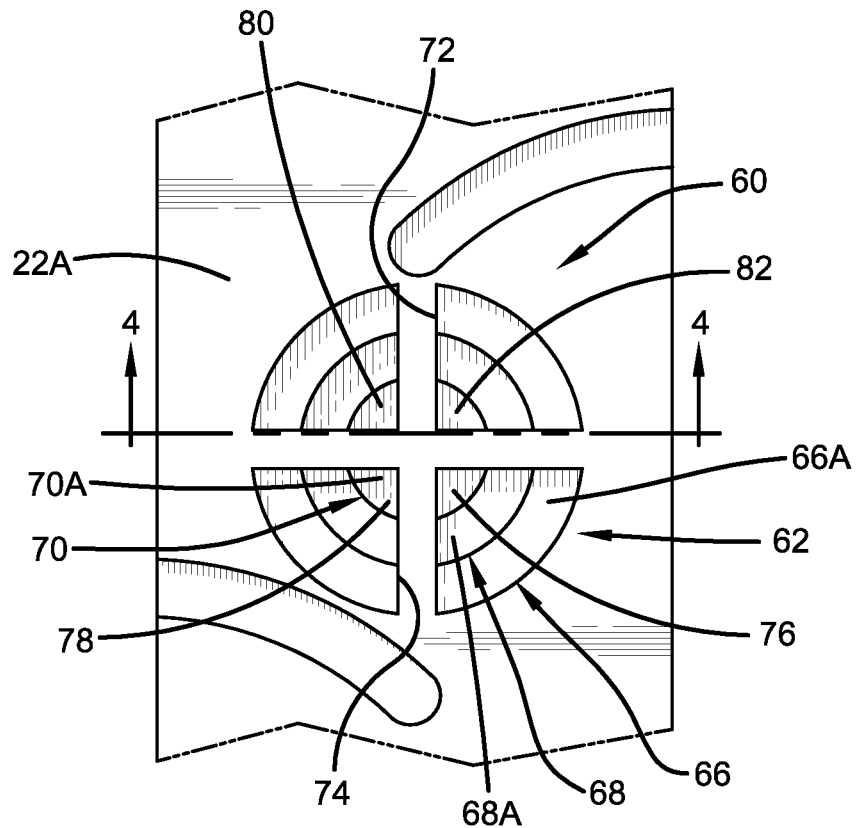
FIG. 3 is a fragmentary plan view of the tire and tread wear indicator shown in FIG. 1.
Figure 4:
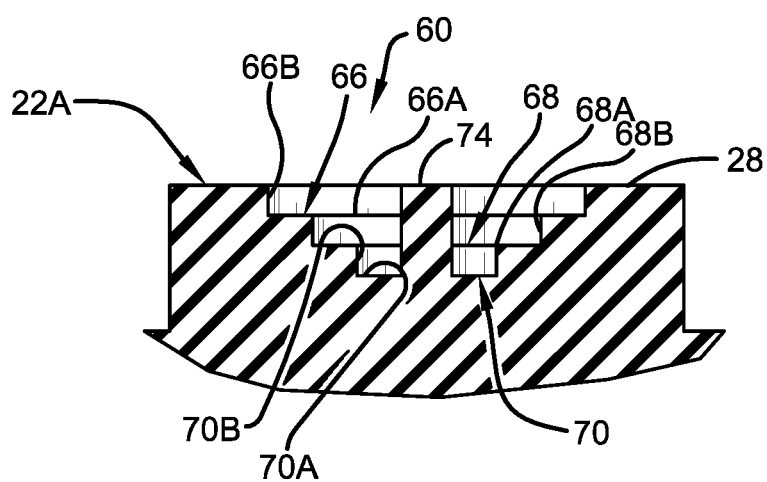
FIG. 4 is a cross-sectional view of the tire and tread wear indicator taken along line 4-4 in FIG. 3.

Turning first to FIGS. 1 through 4, an exemplary tire is indicated at 10 and includes a pair of sidewalls 12 and 14 extending from respective bead areas 16 (only one shown) to a tread 20. The tread 20 includes a plurality of tread elements 22 that are defined by circumferential grooves 24 and lateral grooves 26. It is to be understood that any tread configuration may be employed with the present invention. Formed in a selected one of the tread elements 22A is an exemplary embodiment of the tread wear indicator of the present invention, indicated generally at 60. It is to be further understood that the tread wear indicator 60 may be formed in any one of the tread elements 22, and that the tire 10 may include more than one tread wear indicator.

The tread wear indicator 60 preferably is formed in the selected tread element 22A equidistant between the circumferential grooves 24 that are disposed on each side of the selected tread element, and equidistant between the lateral grooves 26 on the selected tread element. The tread wear indicator 60 is formed with a configuration that includes a plurality of concentric steps, which preferably are circular. More particularly, a plurality of step elements 62 descends radially inwardly from a radially outward surface 28 of the selected tread element 22A. The tread wear indicator includes at least two elements 62, and preferably three or more elements. As will be described below, each element 62 is similar to the other elements in shape and configuration.

A first or top step 66 includes an axially-extending surface 66A that is approximately parallel to and radially inward of the outward tread surface 28. A radially-extending surface 66B extends from the radially outward tread surface 32 to the axially-extending surface 66A in an approximately perpendicular manner.

A second or middle step 68 includes an axially-extending surface 68A that is parallel to and radially inward of the axially-extending surface 66A of the first step 36. The axially-extending surface 68A of the second step 68 is disposed concentrically inwardly of the axially-extending surface 66A of the first step 66. A radially-extending surface 68B extends approximately perpendicularly from the axially-extending surface 66A of the first step 66 to the second step axially-extending surface 68A.

A third or bottom step 70 includes an axially-extending surface 70A that is parallel to and radially inward of the axially-extending surface 68A of the second step 68. The axially-extending surface 70A of the third step 70 is disposed concentrically inwardly of the axially-extending surface 68A of the second step 68. A radially-extending surface 70B extends approximately perpendicularly from the axially-extending surface 68A of the second step 68 to the third step axially-extending surface 70A.

The height of each one of the step elements 62 is based upon the number of steps and the minimum desired indicator height employed for a particular configuration of the tread wear indicator 60. Preferably, each step 66, 68 and 70 is at a set height which corresponds to a specific percentage of the recommended tread height. More particularly, the new, unworn surface 28 of the tread element 22A is considered to be 100 percent of the recommended tread height. The designers of the tire 10 typically establish a thickness of the tread elements 22 that corresponds to a minimum tread height, which is may be referred to as zero percent of the recommended tread height.

Preferably, the axially-extending surface 66A of the first or top step 66 is at a height that corresponds to 75 percent of the recommended tread height, thus indicating a level or height at which 75 percent of the recommended tread height remains. The axially-extending surface 68A of the second or middle step 68 preferably is at a height that corresponds to 50 percent of the recommended tread height, thus indicating a level or height at which 50 percent of the recommended tread height remains. The axially-extending surface 70A of the third or bottom step 70 preferably is at a height that corresponds to 25 percent of the recommended tread height, thus indicating a level or height at which 25 percent of the recommended tread height remains. Thus, when the tread wear indicator 60 is no longer visible, less than 25 percent of the recommended tread height remains, communicating the need for tire replacement to a user.

The tread wear indicator 60 also includes a laterally-extending wall 72, which extends in a direction across the selected tread element 22A, and a circumferentially-extending wall 74, which extends in the circumferential direction of the tire 10. The laterally-extending wall 72 and the circumferentially-extending wall 74 extend perpendicular to one another across the indicator 60 and divide the indicator into four quadrants 76, 78, 80 and 82.

By being divided into quadrants 76, 78, 80 and 82, the tread wear indicator 60 enables checking of vehicle alignment through an inspection of the wear pattern of the tire 10. For example, comparison of quadrant 76 to 82, or of quadrant 78 to 80, indicates the uniformity of wear of the tire 10 in the forward and reverse rotational directions, which is referred to as "heel-toe tread wear". Comparison of quadrant 76 to 78, or of quadrant 80 to 82, indicates the uniformity of wear of the tire 10 in a lateral direction across the tread elements 22, which is referred to as "lateral block wear". In this manner, a user can view quadrants 76, 78, 80 and 82 of the tread wear indicator 60 to easily determine heel-toe tread wear and/or lateral block wear, which in turn provides an indication of the uniformity of tire wear and thus the vehicle alignment.

By being located in the selected tread element 22A, the tread wear indicator 60 is easy for a user to see, does not interfere with the performance of the grooves 24 and 26 or the tread 20, and is economical to form.

Figure 5:
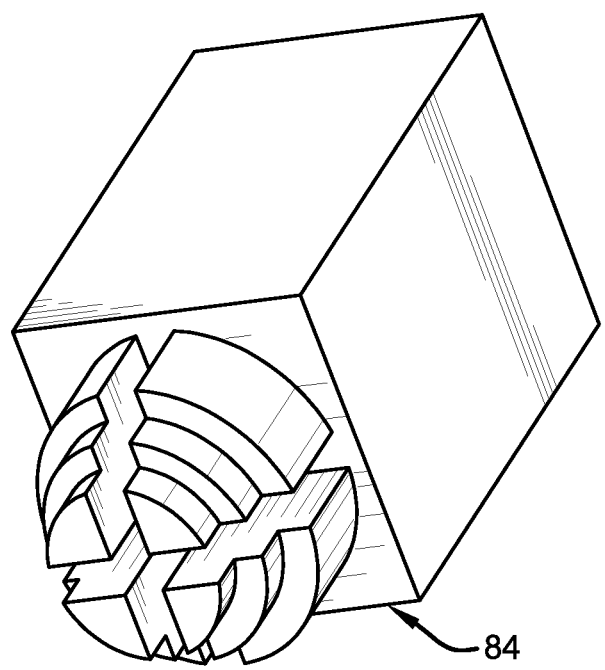
FIG. 5 is a perspective view of a mold insert used to form the tread wear indicator shown in FIG. 1.

Turning to FIG. 5, the tread wear indicator 60 preferably is formed in the tire 10 when the tire is cured. As is known in the art, the tire 10 is cured in a mold (not shown). During curing, the tread 20 is formed. To form the tread wear indicator 60, a die insert 84 is formed with the above-described features of the tread wear indicator. The die insert 84 is disposed in a corresponding opening formed in the tire curing mold, and when the tread 20 is formed on the tire 10 during curing, the tread wear indicator 60 is also formed. The die insert 84 may be 3D printed, cast or fabricated, and may be formed of any suitable mold material, including steel, aluminum and alloys thereof.

The present invention also includes a method of forming a tread wear indicator 60 in a tire 10 and a method of using a tread wear indicator 60 in a tire 10. Each method includes steps in accordance with the description that is presented above and shown in FIGS. 1 through 5.

It is to be understood that the structure of the above-described tread wear indicator may be altered or rearranged, or components or steps known to those skilled in the art omitted or added, without affecting the overall concept or operation of the invention. For example, heights for the step elements other than those described above may be employed without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire including a tread wear indicator, wherein the tire includes a pair of sidewalls and a tread, and the tread includes a plurality of tread elements defined by circumferential grooves and lateral grooves, the tread wear indicator comprising:

an indicator being formed in a selected one of the tread elements;

the indicator including a plurality of concentric step elements descending radially inwardly from a radially outward surface of the selected one of the tread elements;

each step element including an axially-extending surface being approximately parallel to and being radially inward of the radially outward surface of the selected one of the tread elements, and a radially-extending surface extending approximately perpendicular to the axially-extending surface;

a laterally-extending wall extending across the indicator in a lateral direction of the tire; and a circumferentially-extending wall extending across the indicator in a circumferential direction of the tire;

wherein the laterally-extending wall and the circumferentially-extending wall each comprise two opposing side surfaces.

2. The tire including a tread wear indicator of claim 1, wherein the laterally-extending wall and the circumferentially-extending wall divide the indicator into four quadrants.

3. The tire including a tread wear indicator of claim 1, wherein the indicator is formed in the selected tread element equidistant between circumferential grooves that are disposed on each side of the selected tread element and adjacent the selected tread element, and equidistant between lateral grooves on the selected tread element.

4. The tire including a tread wear indicator of claim 1, wherein the indicator includes at least three step elements.

5. The tire including a tread wear indicator of claim 1, wherein the axially-extending surface of each step element includes a circular shape.

6. The tire including a tread wear indicator of claim 1, wherein the axially-extending surface of each step element is disposed at a height that corresponds to a selected percentage of a recommended tread height.

7. The tire including a tread wear indicator of claim 1, wherein the indicator is formed with an insert that is disposed in a mold which cures the tire.

8. The tire including a tread wear indicator of claim 1, wherein the axially-extending surface of a first one of the step elements is disposed at a height that corresponds to about seventy-five percent of a recommended tread height, the axially-extending surface of a second one of the step elements is disposed at a height that corresponds to about fifty percent of the recommended tread height, and the axially-extending surface of a third one of the step elements is disposed at a height that corresponds to about twenty-five percent of the recommended tread height.

* * * * *